Fig. I.

Oct. 5, 1965 — E. FRISCH — 3,209,468
FORCE FIELD FACILITY
Filed May 24, 1963 — 7 Sheets-Sheet 1

WITNESSES
Robert Baird
Bernard R. Gieguay

INVENTOR
Erling Frisch.
BY
ATTORNEY

United States Patent Office 3,209,468
Patented Oct. 5, 1965

3,209,468
FORCE FIELD FACILITY
Erling Frisch, Pittsburgh, Pa., assignor to Westinghouse Electric Corporation, East Pittsburgh, Pa., a corporation of Pennsylvania
Filed May 24, 1963, Ser. No. 283,091
13 Claims. (Cl. 35—12)

This invention relates to apparatus for inducing simulated force fields of a given magnitude and direction, and more particularly to such appartus which is capable of producing a simulated gravitational field in environments inhabitable by men and animals for prolonged periods.

During the past several years there has risen a need for some means for producing for study purposes a simulated gravitational force field which is substantially greater than that encountered on this planet. Conventionally, various types of centrifuges are available for inducing gravitational fields; however, such equipment has been designed exclusively for inducing artificial gravitational force fields of relatively high-G accelerations for short periods of time. Because of their comparatively unsophisticated construction such machines had to be shut down periodically for the care and feeding of laboratory animals aboard the centrifuge, or in the case of human occupants thereof to perform similar biological functions. Of course, these deficiencies in conventional gravitational simulators result from the cramped quarters therein and also from the fact that no convenient means of ingress or egress have been afforded, particularly while the centrifuge or simulator is in operation.

For these reasons in the past it has been only feasible to study with any degree of thoroughness the effects of rather high gravitational force fields upon men and animals, which can be endured for only brief intervals, that is to say those fields not greatly in excess of two gravitational accelerations. To pose the question in another fashion, with artificially induced fields of less than say 2 or 2½ G's no significant experimental data could be recorded, save for the obvious motor reactions of the animals or men confined in the conventional centrifuges for this purpose, due to the time limitations imposed upon a given experiment by such equipment. Of course, for induced gravitational fields in excess of about 2 or 2½ G's the duration of a given experiment is limited not so much by the character of the equipment as by the physical endurance of the human volunteers or of the experimental animals.

Consequently, there exists a relatively large, unexplored area in biogravitational analyses lying in the area between 1 G and 2 to 2½ G's of gravitational force. However, there is a pressing need to explore this area of gravitational effects upon the human organism for a number of reasons. The very meager preliminary data which is presently available appear to indicate that prolonged subjection of animal organisms to force fields in this range of accelerations can produce stunted growth, increased body organ weight and increased mineral deposits in the skeletal system of the animal organism. These effects, of course, occur relatively slowly so that lengthy exposures of the organism to gravitational fields is necessary for the proper study and evaluation of these effects. On the other hand, exposure of animal or human organisms to simulated gravitational fields significantly higher than 2 or 2½ G's would not be as productive of biological research for such effects for the reason that the effects under consideration would occur at these accelerations much more slowly than the obvious effects of exhaustion and attendant physical damage to the organism. These last-mentioned effects can, of course, be studied more or less adequately with presently available equipment in tests upon experimental organisms.

There are other practical reasons for evaluating the results of prolonged exposure to low super-earth gravity fields. For example, little is presently known of the biological effects of prolonged exposure to weightlessness, such that would occur during prolonged flights of earth-orbiting spacecraft or during future interplanetary missions in presently conceived, high-acceleration space vehicles. However, some light has been shed upon these possible effects by certain ground-based experiments in which laboratory animals or human volunteers have been immersed in saline solutions at body temperatures in an attempt to approximate the weightless environment. In such tests it has been demonstrated that skeletal demineralization and loss of muscle-tone occur. Apart from the attitude of pure scientific research, then, there is a strong suspicion that the human organism can be pre-conditioned for exposure to the weightless environment, for either orbital or planetary missions, by a certain, but as yet unknown, proportional exposure to simulated gravities higher than the earth field.

In order to make an intelligent application of such pre-conditioning or gravitational overcompensation for weightlessness it will be necessary to ascertain what type of individual as to age, physical and mental characteristics etc. is most susceptible to pre-conditioning, the amount of pre-conditioning required for various periods of weightlessness, and whether there are any permanent physiological after-effects of the pre-conditioning or of the pre-conditioning plus subsequent weightlessness. Attendant upon all of these factors are the techniques of application of the simulated gravitational fields and the duration and degree of exposure thereto, etc.

In order to acquire such data it is obvious, then, that equipment must be utilized in which men and/or animals can be exposed for extended periods to greater than earth field gravities for extended periods under more or less normal living conditions.

In view of the foregoing, an object of the present invention is the provision of a novel and efficient form of gravitational facility.

Another object of the invention is the provision of a facility of the character described wherein the facility is arranged to simulate a relatively low but higher than earth field gravity for prolonged periods.

A further object of the invention is the provision of a facility of the character described wherein environmental living conditions for either men or animals can be afforded for prolonged periods without the necessity of the men or animals leaving the facility.

Still another object of the invention is the provision of a gravitational facility wherein operating or volunteer personnel can enter or leave the facility during operation thereof without temporarily shutting down the facility or otherwise changing the induced gravitational field thereof.

Another object of the invention is the provision of a gravitational facility adapted particularly for the use of subjecting laboratory animals to simulated gravitational fields wherein service personnel can freely enter or leave the facility during operation for the purpose of servicing the animals.

Another object of the invention is to provide a gravitational facility having living compartments for either men or animals distributed about a toroidal periphery thereof and provided further with carriage means for transporting men and material from a relatively stationary access port to any point within the interior of the torus during rotational operation thereof.

Still another object of the invention is the provision of a gravitational facility having means whereby either the compartments for men or for animals respectively are disposed or aligned along the force vector of the resultant gravitational field induced by operation of the facility and by the interaction thereof with the earth's gravitational field.

Another object of the invention is the provision of a novel driving mechanism for the carriage means characterized above for use with the gravitational facility.

A still further object of the invention is the provision of novel driving and bearing arrangements for the purpose of supporting and rotating the gravitational torus mentioned above.

Still other objects of the invention are the provision of suitable means for supplying controlled electrical energy to the drive mechanisms and related equipment of the facility, and for providing water and sewage disposal for the living compartments forming part of the gravitational facility.

The foregoing and other objects, features and advantages of the invention will become more apparent during a perusal of the following detailed description of the invention particularly when taken in conjunction with the drawings wherein.

Figure 3:
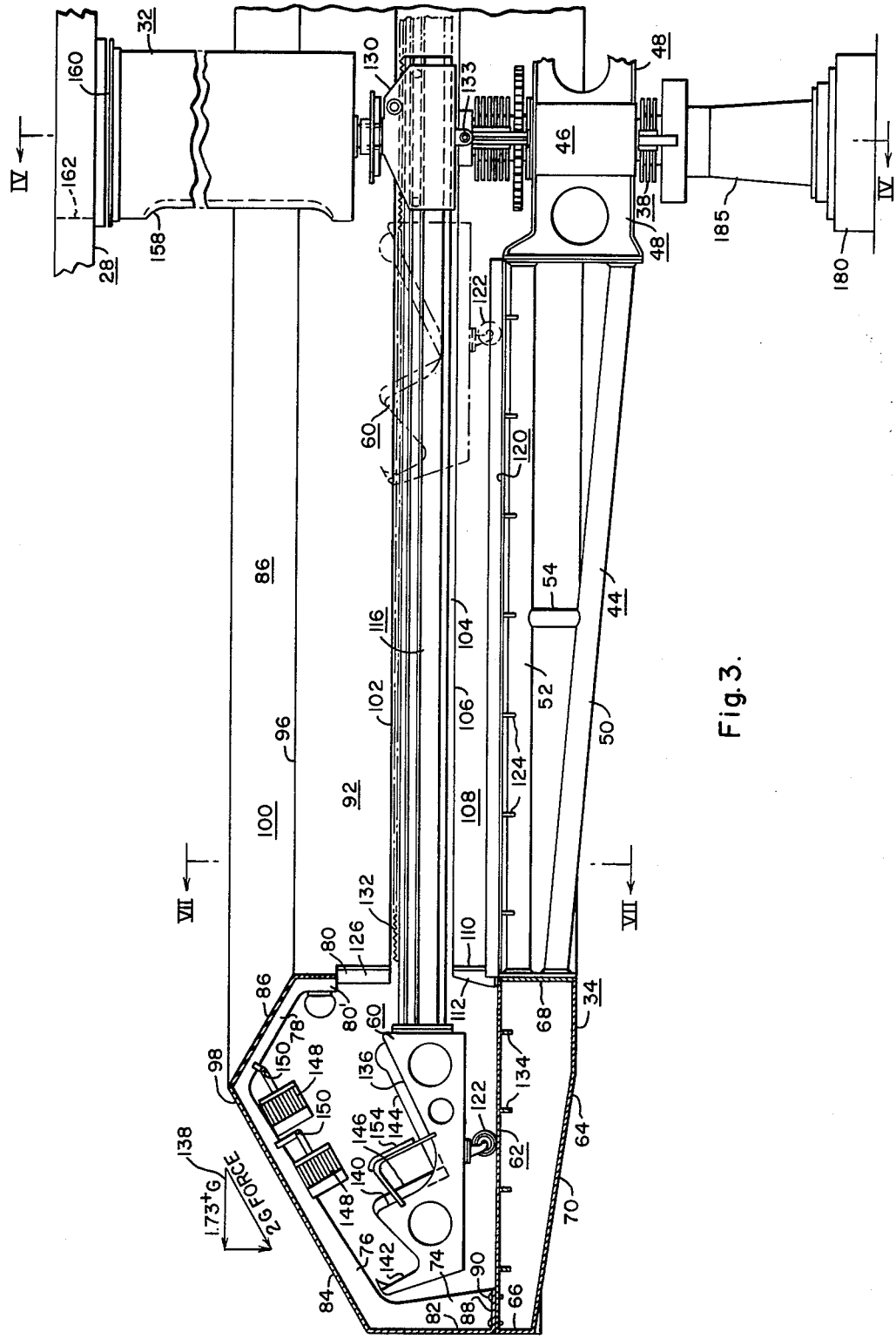
FIG. 3 is an enlarged elevational view, partially in vertical section, of the operating portions of the gravitational facility particularly as adapted in this embodiment for use with laboratory animals, as taken along reference line III—III of FIG. 2.
Figure 7:
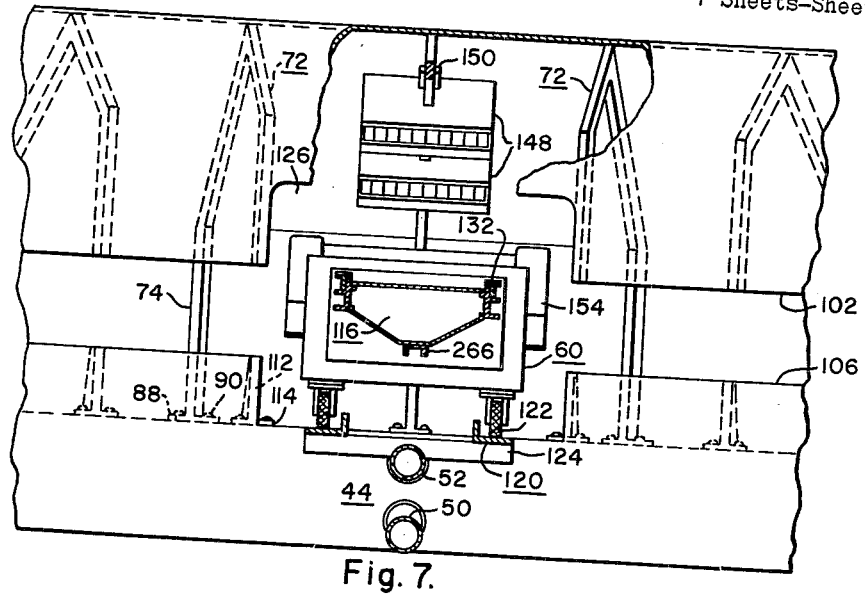
Figure 8:
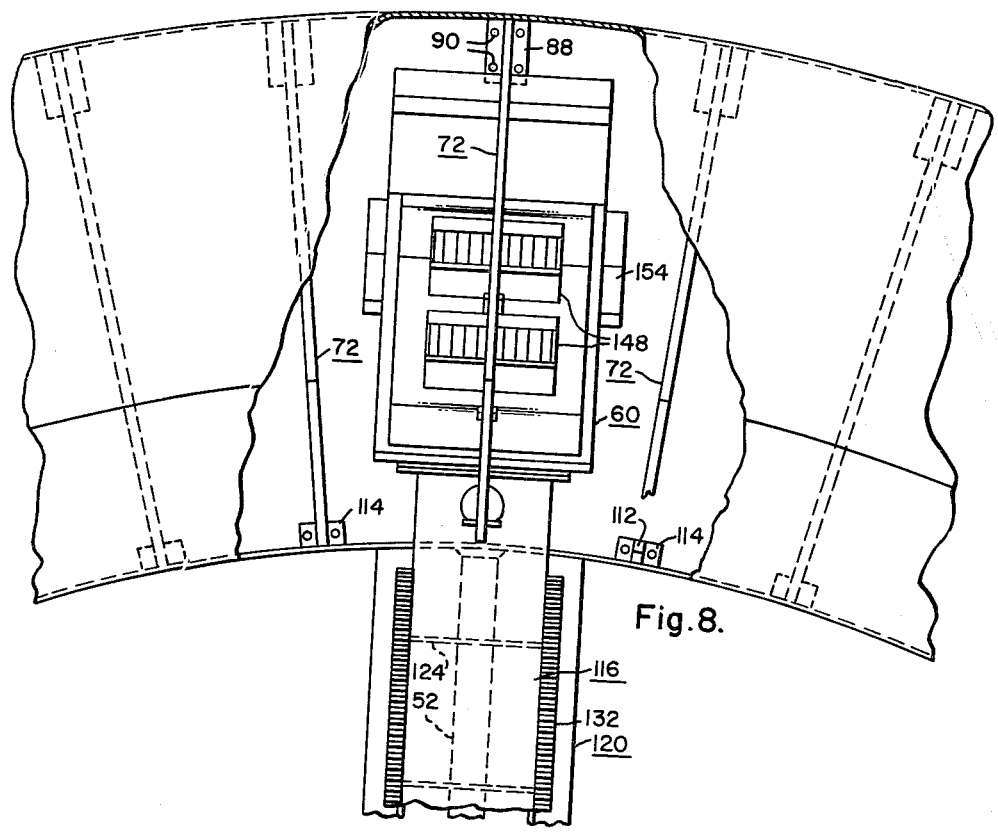

FIG. 7 is an elevational view partially in section of a portion of the inner periphery of the rotatable torus of the gravitational facility and taken along reference line VII—VII of FIG. 3; and FIG. 8 is a top plan view of a portion of the gravitational facility as depicted in FIG. 3 of the drawings and taken generally along reference line VIII—VIII thereof, with parts being broken away and other parts being omitted to illustrate the invention more clearly.

With the foregoing environmental background and objectives of the invention in view, there follows a brief description of the underlying principles and novel features of the invention.

Briefly, the facility comprises means for artificially inducing gravitational fields by means of a rotating structure, or rotor which of course utilizes centrifugal and centripetal forces. In one arrangement contemplated by the invention, the rotating structure includes an outer hollow torus which is supported from a plurality of radial spoke arrangements which are in turn secured to a central rotatable hub. One of the spoke arrangements, or an additional spoke if desired, is shaped to serve as a track for retractable carriage means which is inserted and withdrawn relative to the torus by a boom or other suitable coupling secured both to the carriage means and to a driving mechanism therefor mounted on the supporting hub. The carriage means is thus arranged to be inserted into and to traverse the entire inner periphery of the torus even when the latter is rotated.

Personnel access means is also mounted on the aforementioned supporting hub so that operating or volunteer personnel can enter the carriage means through the access port and hence also any area throughout the interior of the hollow torus. In one form of the invention the cages employed therewith for housing laboratory animals are mounted in a novel, pivoted arrangement such that the cages align themselves automatically with the force field vector induced as a result of interaction between the artificial gravity produced by the facility and the earth's gravitational field.

In another arrangement of the invention a rotatable torus of the gravitational facility is furnished with living compartments which likewise are inclined, in accordance with the invention, so as to be aligned with the anticipated gravitational force vector at operational speeds of the facility. In the case of living quarters for human habitation, means are also afforded for furnishing water and electricity to the living quarters and for withdrawing sewage or waste therefrom.

Figure 1:
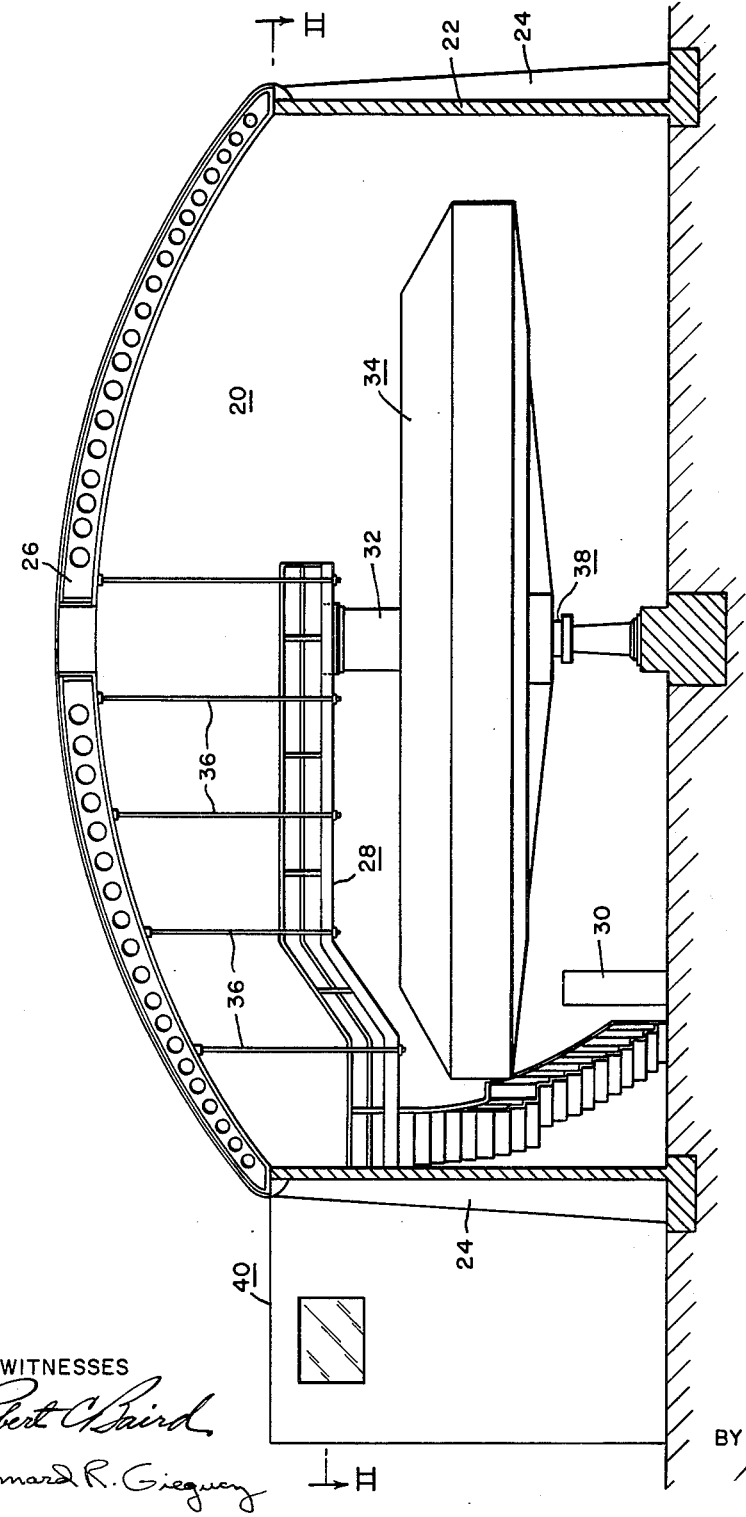
FIGURE 1 is a vertically sectioned, partially perspective view of one form of gravitational facility arranged in accordance with the invention and illustrating the housing, support, and access structures associated with the facility.
Figure 2:
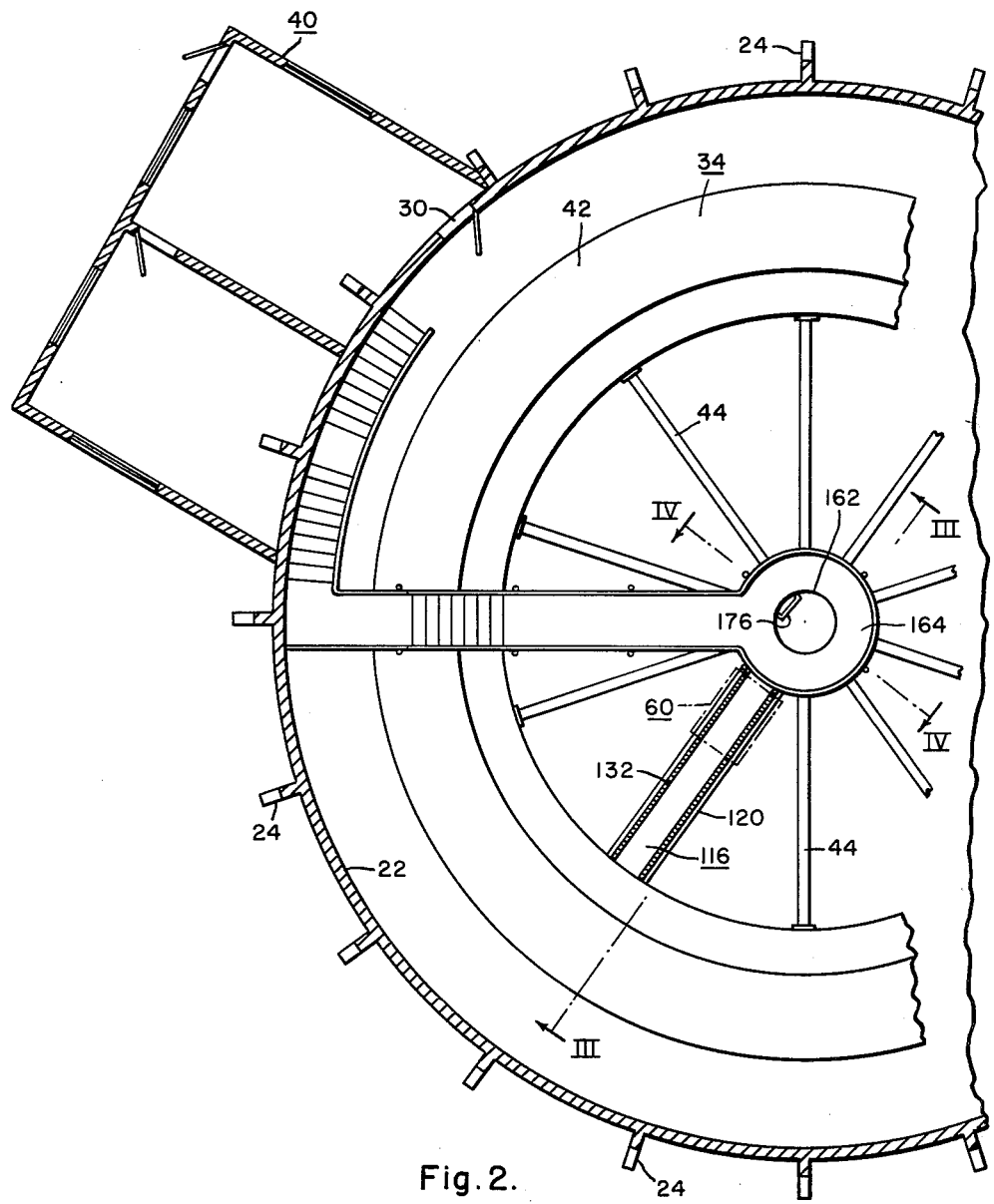
FIG. 2 is a partial top plan view of the facility with certain portions thereof being sectioned as indicated by the location of reference line II—II of FIG. 1.

Referring now more particularly to FIGS. 1 and 2 of the drawings, the illustrative form of the invention disclosed therein comprises a facility enclosure or building 20 having in this example generally circular walls 22 reinforced with buttresses 24. The roof of the structure 20 is domed in this case and is formed by a plurality of radially extending steel girders or joists 26. The domed structure provides adequate strength for support of the access stairway or catwalk denoted generally by the reference character 28, which provides an access corridor from entrance 30 (FIG. 2) of the building 20 to an access port means 32 associated with a supporting hub and bearing support arrangement of the gravitational facility proper denoted by reference character 34 and described in greater detail hereinafter.

The catwalk 28 is suspended from the domed roof 26 by means of a plurality of tie rods 36. For the purpose of housing operating, volunteer, or supporting personnel an office and anteroom structure desirably is provided exteriorly of the facility building proper, at the latter's entrance 30.

Figure 4:
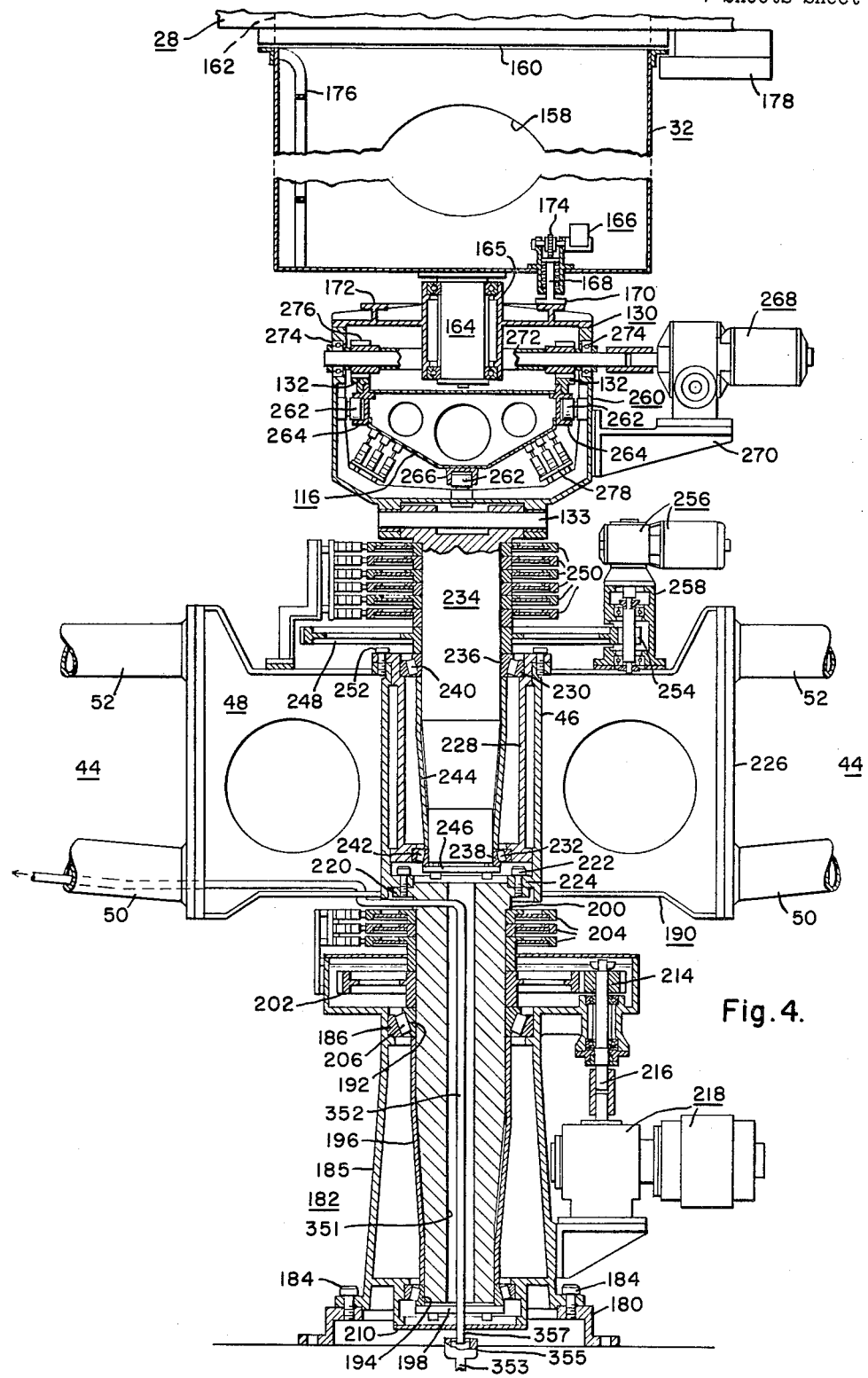
FIG. 4 is a further enlarged vertically sectioned view of the driving and supporting mechanism for the gravitational facility, as taken along reference lines IV—IV of FIG. 3.

The gravitational facility 34 includes a hollow toroidal structure or rotor 42, which in turn is supported by means of a plurality of spoke assemblages 44 from a supporting hub member 46. The hub 46 as better shown in FIG. 4 is mounted atop the drive shaft 38. The hub 46 is provided with an equal number of spoke brackets 48 to which the spoke assemblages 44 are secured at their inwards ends respectively.

For greatest load carrying capacity each spoke assemblage 44 in this instance consists of a pair of divergent tubular booms 50 and 52 desirably lying in the same vertical plane and joined at their outer ends to the toroidal structure 34 and at their inner ends to the associated spoke bracket. The tubular booms 50 and 52 are further stabilized intermediate their ends by a relatively short vertical brace 54. In this application the tubular booms 50 and 52 and other structural members of the gravitational facility desirably are fabricated from a light metal, such as aluminum or its alloys, in order to reduce the weight upon the main bearings associated with the drive and supporting shaft 38.

Referring now to FIG. 3 of the drawings, one arrangement of the gravitational facility 34, particularly as adapted for housing laboratory animals for extended periods is disclosed therein. In this arrangement, the rotor 42, including an outer hollow torus 43 which is affixed to the outer ends of the radial spoke assemblages 44, is so shaped in its cross-sectional configuration, in this example, such that the gravitational facility is most advantageously used to induce a 2 G gravitational field. It is to be understood, of course that the facility can be shaped and otherwise adapted for other accelerations in an obvious manner. Further, the torus 43 together with a retractable and rotatable chair structure 60 is arranged such that the entire inner area of the torus can be serviced by an operator from a sitting position in the chair 60 without the necessity of removing himself therefrom while in the 2 G or other higher than earth gravity field, as explained hereinafter.

The torus 43 proper includes a horizontally disposed annular gangway structure 62 and a bottom wall structure 64 spaced below the gangway 62 and joined thereto by a pair of generally concentric short annular wall members 66 and 68 of appropriately large diameters. The inwardly disposed wall member 68 is of course secured directly to the outward ends of the spoke assemblages 44 as by welding or bolting (not shown). Those cross-sectional configurations of the gangway 62 and bottom wall 64 which are disposed adjacent the ends of the individual spoke assemblages 44 will then be seen to form cantilever beam extensions thereof for the purpose of supporting the torus 43 proper. In accord with conventional beam stress analysis, the outer end of the cross-sectional configuration, as denoted by the reference character 70 can be tapered to conserve material and space without detracting from the strength of the aforementioned cantilever beam extensions. To accommodate the weight of the chair 60 the annular catwalk structure 62 is reinforced with a plurality of beam members 134.

Adjacent the outer peripheral edge portion of the annular gangway 62 are mounted a plurality of cantilever beams 72 of approximately C-shaped configuration. Due to the annular configuration of the facility the beams 72 are appropriately disposed along radii extending outwardly from the central hub or axis of the gravitational facility and are disposed at spaced locations around the outer periphery of the torus 43 so as to afford adequate support to the wall and ceiling coverings presently to be described.

Each cantilever beam 72 comprises a substantially vertical stud portion 74 and a pair of angularly disposed ceiling joist portions 76 and 78. The inner joist portion 78 in turn terminates in a depending second stud portion 80, the purpose of which is described hereinafter. As stated previously the cantilever beams 72 desirably are equally spaced around the periphery of the torus 43, the location of some of which are illustrated in dashed outline in FIG. 3 of the drawings.

The various portions of the C-beams 72 can be provided in a tapered configuration in accord with the diminishing loads thereon as determined by conventional beams stress analysis techniques. For example, part or all of the C-beams can be tapered in the manner illustrated by the first wall stud portion 74 and the first ceiling joist portion 76. Each of the C-beams 72 terminate at their lower heavier ends in a horizontal flange portion 88 whereby the individual C-beams are joined to the gangway 62 by means of bolts 90 or other suitable fastening means such as by welding.

The first-mentioned stud portion 74 of the beams 72 serve, in addition to supporting the remainder of the C-beams 72, as support for the outermost peripheral or outer wall covering 82, which can be provided in a plurality of arcuate segments and can be welded or riveted or otherwise joined to form a completed, relatively short segment of the proper diameter. Similarly the ceiling joist portions 76 and 78 of the C-beams support outward and inward frustoconical sections of relatively reversed contours and denoted generally by the reference characters 84 and 86. The roof or ceiling sections 84 and 86 can be fabricated from a plurality of arcuate sections in the manner described previously in connection with the outer vertical wall structure 82.

As the terminal function of the C-beams 72, a depending partial curtain wall 92 is formed upon the remaining or depending stud portions 80 of the C-beams 72 by a suitable tubular covering 94, which can be fabricated in the manner described previously in connection with the outer vertical wall covering 82. As evident from an inspection of FIG. 3 of the drawings, the curtain wall 92 depends only about one half of the distance from the inner peripheral edge 96 of the roof structure 98–100. Thus the curtain wall 92 defines an upper edge or limit 102 of an inner peripheral slot or opening which extends entirely around the inner peripheral vertical wall portion of the torus 43. The lower limit or edge 106 of the opening 104 is in turn defined by an upstanding, relatively low, complementary curtain wall portion 108. The latter wall portion 108 desirably is formed by a covering member 110 fabricated as described above in connection with the covering 94 and by a plurality of upstanding stud members 112, which desirably are disposed respectively immediately below the depending stud portions 80 of the C-beams 72. The wall studs 112 can be welded or bolted to the gangway 62 by means of their lower flange portions 114.

With this arrangement, then, the slot 104 is disposed horizontally in the torus 43 and is aligned with a retractable and rotatable boom structure 116 which is employed to manipulate the aforementioned access chair 60. Thus when the chair 60 is inserted entirely within the inner or cage compartment 118 within the torus 43, the boom structure and the attached chair 60 can be rotated a full 360°, relative to the torus 43 since with this arrangement it is obvious that no part of the slot 104 is obstructed by any structural member of the torus 43. By means presently to be described the rotation, insertion, and withdrawal of the chair 60 can be accomplished during operation of the gravitational facility so that every area within the inner compartment 118 can be reached and serviced by operating personnel seated in the chair without shutting down the facility and without such personnel's having to leave the chair.

To facilitate movement of the chair on the catwalk 62 and on the track 120 extending substantially in the same horizontal plane as the gangway 62 (and radially along one of the spoke assemblages 44) the chair 160 is provided with at least one caster mounted wheel 122. The track 120 is secured and stabilized relative to its associated spoke assemblage by means of a plurality of transversely extending brackets 124. The track 120, therefore, extends between an enlarged, chair-accommodating portion 126 of the inner peripheral opening 104 through which the chair structure 60 can be inserted and withdrawn relative to the interior 118 of the torus 43. Thus, when the chair 60 is juxtaposed to the widened opening portion 126 the chair 60 can be removed from the position shown in solid outline in FIG. 3 to the retracted position shown in the dashed outline denoted generally by the reference character 128.

In this arrangement that C-beam 72a disposed centrally of the widened opening portion 126 is endowed with a foreshortened second stud portion 80' which of course terminates at the upper edge of the widened portion 126 of the peripheral slot 104. The chair boom structure 116 is rotated and inserted and withdrawn relative to the opening 126 by means of a drive mechanism denoted generally by the reference character 130 of FIG. 3 and described hereinafter in greater detail in connection with FIG. 4 of the drawings. Suffice it to say at this point however that the drive mechanism 130 cooperates with one or more rack gear portions 132 extending along substantially the entire length of the chair boom structure 116 at its upper surface. Additionally, the drive mechanism 130 is pivotally mounted on the upper end of the gravitational facility drive shaft 38 and associated mechanism as denoted by the reference character 132 in order that the drive mechanism and the supporting boom structure 116 may follow any slight deviations of the gangway 62 and the track 120 from their collective horizontal plane.

As best seen from FIG. 8 of the drawings the chair 60 desirably is wide enough to accommodate two service personnel seated side by side. In this arrangement of the invention the chair 60 is rather steeply inclined so that such personnel have the illusion of sitting upright when the chair 60 is fully inserted, during operation of the facility, into the torus 43 as shown by the full lines in FIG. 3 of the drawings. Thus, a back portion 136 of the chair 60 is inclined so as to be substantially parallel with the 2 G gravitational vector induced during operation of this arrangement of the invention. This relationship is seen from the vector diagram denoted generally by the reference character 138 which further shows that a horizontal centrifugal force, as induced by rotation of the torus 43, of about 1.73 G is necessary to induce a resultant 2 G field. Also, for the comfort of chair occupants, a seat portion 140 and foot portion 142 are disposed substantially perpendicularly to the aforementioned 2 G vector. For the occupants' further comfort, the back and seat portions desirably are provided with cushions or mats 144 and 146.

With this construction, the chair 60 is adapted to support service personnel, in this example, for gravitational accelerations of up to 2 G's without inducing an illusion of tipping forward. For larger gravitational fields induced with the apparatus described herein the resultant force vector would of course have even less inclination to the horizontal. Similarly, the chair 60 would have to be provided with less inclination than that shown by suitable adjustment means (not shown) or by providing the back seat and foot portions with wedge-shaped inserts (not shown) of proper angularity. For substantially greater than 2 G accelerations, however, the chair 60 would have to be replaced with a contour couch of known configuration to support service personnel in a lying-down position.

When the chair 60 is fully inserted into the rotatable torus 43 to the position as shown in FIGS. 3 and 8, operating personnel seated therein are juxtaposed to a pair of animal cages 148 for the purpose of adding or withdrawing laboratory animals or for feeding or otherwise servicing the same. Each cage 148 is hingedly supported, as denoted by the reference character 150, so that the cage is always aligned with the natural or induced gravitational force vector. In the positions of the cages as illustrated, the cages are aligned with the 2 G force vector shown in the aforementioned vector diagram 138, as would be the case during operation of the gravitational facility as specifically described herein. In order to facilitate support and alignment of the cages 148 in this manner, the ceiling rafter portions 76 of the C-beams 72 are formed so as also to lie substantially parallel with the aforementioned 2 G force vector, as better shown in FIG. 3 of the drawings. Thus, the linear intersection of any vertical plane passing through the frustoconical ceiling section defined collectively by the rafter portions 76 and also passing through the central axis of the rotor 42 would also lie parallel to the 2 G force vector. However, as explained above in connection with the chair 60, the rafter portions 76 can be provided with some other inclination where necessary to accommodate or to adapt the apparatus to operation at some other induced gravitational field.

Similar cages 148 or other types of cages and experiment apparatus can be distributed in a like manner about the periphery of the rotatably supported torus 43 of the rotor 42. Food, water and other supplies can be conveyed into and out of the torus 43 by means of a supply box 152 such as that shown in FIG. 5 of the drawings and attached to arm structure 154 of the chair 60. To prevent spillages of the contents of the supply box 154 the latter desirably is hingedly mounted to the chair arm 154 as denoted by reference character 156 and for the vector-seeking purpose discussed previously in connection with the hinged supports of the animal cages 148.

When the chair 60 is withdrawn to its retracted position as represented by the dashed outlines 128 of FIG. 3, ingress and egress relative to the gravitational facility is afforded by the aforementioned access hatch 32 of generally cylindrical configuration. The access hatch is provided with two entrances: the entrance 158 in the side wall portion of the hatch 32 and rotatable therewith as described shortly to a position generally above the chair 60 in its retracted position; and the entrance 160 which is the upper open end of the cylindrical access hatch. The latter entrance communicates in the manner described below with a centrally disposed opening 162 afforded by the terminal annular portion 164 of the catwalk 28 as better shown in FIGS. 1 and 2 of the drawings.

As better shown in FIG. 4 of the drawings, the access hatch 32 is mounted upon a short stub shaft 164 extending downwardly from the central portion of the bottom wall of the hatch. The stub shaft 164 is mounted upon a suitable bearing structure denoted generally by the reference character 166 which in turn is housed in the top portion of the chair positioning and drive mechanism denoted generally by the reference character 130. During operation of the gravitational facility the access hatch 32 can be rotatively aligned with the retracted position of the chair 60 as shown in the aforementioned dashed outline 128 of FIG. 3 by application of clutch means including a positioning brake 166 so that the access hatch 32 can be caused to rotate slightly relative to the gravitational facility until its entrance 158 is disposed directly above the inner end of the retracted chair 60 as shown in FIG. 3, after which the access hatch, of course rotates with the rotor 42. In furtherance of this purpose the positioning brake 166 includes a spring loaded piston and cylinder arrangement 168 with the pistons terminating in a discoidal brake shoe 170. The brake shoe 170 is cooperative with an annular braking surface 172 supported upon the top surface of the chair driving mechanism 130. In operation the brake piston is depressed by an eccentric 174 which in turn is actuated by a pedal-operated linkage designated generally by the reference character 175.

When thus aligned, operating personnel can then enter the chair 60 in its retracted position by simply stepping down from the access hatch entrance 158. Such personnel also can enter and leave the access hatch 32 by means of a ladder 176 and the upper entrance or open end 160 which in turn communicates with the opening 162 in the catwalk 28. In furtherance of this purpose the aforementioned clutch means includes another brake arrangement (not shown) which can be similar to the positioning brake arrangement 166, and which is mounted on the catwalk 28 adjacent the upper extremity of the access hatch 32 for engagement therewith when suitably actuated. By application of the brake any rotative movement of the access hatch as a result of application of the first described positioning brake 166 can be terminated so that the hatch 32 then assumes a stationary position relative to the catwalk 28, although the gravitational facility is in operation. The ladder 176 then can be used either for entering or leaving the hatch 32 through the catwalk opening 162 and the hatch opening 160.

With this arrangement it is apparent that operating personnel can readily enter and leave the chair 60 in its retracted position and the access hatch 32 of the gravitational facility even though the latter is in operation without being subjected to a gravitational force field substantially in excess of the earth field, inasmuch as the locations of the access hatch and of the chair 60 in its extreme retracted position are at or very close to the central axis of the gravitational facility. Thus, the operating personnel are not subjected to substantial gravitational forces until seated in the chair 60 and the latter is driven to its peripheral positions by the drive mechanism 130.

Referring now in greater detail to FIG. 4 of the drawings, one arrangement of a supporting and driving mechanism for the entire gravitational facility is illustrated therein. This mechanism comprises a supporting base 180 of appropriately rigid construction, upon which is supported an oil filled bearing housing 182 secured to the support 180 by means of mounting bolts 184. The housing 182 includes a lower flared skirt portion 184 on the inner periphery of which are supported in spaced relation upper and lower bearing races 186 and 188. At the upper end of the housing 182, the latter is dished outwardly to accommodate the drive gearing presently to be described. Inserted generally within the bearing housing 182 is the aforementioned driving and supporting shaft 38, the upper end portion of which projects above the bearing housing 182 for securance to the hub and spoke bracket assembly denoted generally by the reference character 190. Complementary inner bearing races 192 and 194 are mounted on the driving shaft 38 at positions juxtaposed to the outer bearing races 186 and 188 respectively. The inner bearing races 192 and 194 are supported in these positions on the driving shaft 38 by means of a generally tubular separator member 196 and a lower shaft end cap 198. The inner bearing races 192 and 194 are positionally limited in the upper direction by means of a shaft shoulder 200 adjacent the upper end of the shaft, the hub portion of the drive gear 202, and similar hub portions of polyphase collector rings denoted generally by the reference character 204 and described more specifically hereinafter. When thus located the shaft 38 is supported concentrically and anti-frictionally within the bearing housing 182 by means of upper and lower roller bearings 206 and 208 respectively. The lower end portion of the bearing housing 182 is sealed by means of a discoidal cap 210 in order to prevent the escape of oil therefrom.

The drive gear 202, which is desirably shrunk-fitted and pinned through an opening 212 therefor in the shaft 38, is driven by a complementary planetary gear 214 which in turn is pinned to an extended output shaft arrangement 216 of a drive motor and gear box assembly denoted generally by the reference character 218.

As denoted previously the hub and spoke bracket assembly 190 is secured to the upper end of the supporting and driving shaft 38, which upper end is flanged for this purpose as denoted by the reference character 220. Securance thereto is accomplished by mounting bolts 222 appropriately inserted through an apertured inwardly extending flange portion 224 of the hub 46. A plurality of spoke brackets 48, with ten being utilized in this arrangement of the invention are secured about the vertical periphery of the hub 46. As discussed previously, the spoke assemblages 44 are secured at their inner ends respectively to the vertically flanged portions 226 of the spoke brackets 48.

To provide support for the chair positioning and retracting drive mechanism 130, a bearing retaining sleeve 228 is inserted within the tubular portion 46 of the hub and spoke bracket assembly 190. The sleeve 228 is shaped to afford upper and lower shouldered portions which accommodate in a thusly spaced relation upper and lower outer bearing races 230 and 232. A supporting and driving shaft 234 for the chair retracting drive mechanism 130 is supported within the bearing sleeve 228 by means of the juxtaposed inner bearing races 236 and 238 and the related roller bearings 240 and 242. The inner races 236 and 238 are spacedly located in this position by means of the separator sleeve 244 and the shaft end cap member 246 and by the chair pivoting gear 248 and the collecting rings 250 in the same manner as described above in connection with the main drive shaft bearing races 192 and 194. The bearing retaining sleeve 228 is secured at its upper flanged ends to the upper end of the tubular hub 46 by means of cap screws 252.

The chair pivoting drive gear 248, which can be rigidly secured to the drive shaft 234 in any convenient manner as by pinning or shrink fitting, is driven by means of a pinion gear 254 and the driving motor and gear box denoted generally by the reference character 256. The latter drive mechanism 256 is mounted on a suitable support 258 therefor which in turn is secured to one of the spoke brackets 48 so that the chair pivoting drive mechanism 256 is rotated with the rotating torus 43 in associated supporting structures therefor of the gravitational facility and thus can impart additional relative rotation to the chair positioning mechanism.

To the upper end of the chair pivoting shaft 234 is secured the aforementioned chair retracting drive mechanism 130, which is operative to extend and retract the chair boom 166. The chair extending and retracting mechanism 130, includes a housing 260, the underside of which is hingedly secured to the upper end of the chair pivoting shaft 234 as denoted by the reference character 132.

In this arrangement of the invention the housing 260 is of rectangular tubular configuration with two opposed open sides to accommodate passage of the retractable chair boom 116 discussed briefly heretofore. Also as mentioned above, the upper wall of the housing 260, which desirably is removable, supports the access hatch 32 and its supporting shaft 164 as well as the brake drum 172.

The passage of the chair boom 116 through the housing 260 is supported by two horizontal and one vertical pairs of guide rollers denoted generally by the reference characters 262. In furtherance of this purpose cooperating channel members, U-shaped in cross section, 264 and 266 are mounted on the sides and bottom respectively of the chair boom 116. The side channel members 264 additionally include an upwardly extended flange running the length of the channel members 264 to which are bolted respectively the aforementioned gear racks 132 which also extend substantially the entire length of the chair boom 116.

To retract and to extend the chair boom 116 a drive motor and gear box denoted generally by the reference character 268 is mounted on a suitable support 270 secured to an outward side surface of the housing 260. An extended shaft 272 of the drive mechanism 268 extends through the housing 260 and is supported on anti-friction devices 274 in this example mounted in the side walls of the housing 260. The shaft 272 in addition is provided with a pair of pinion gear 276 which are rigidly secured to the shaft 272 in a conventional manner and disposed for engagement with the rack gears 132 respectively. To support the component parts of the chair boom driving mechanism 130 the housing 260 thereof is strengthened by a plurality of ribs 278. On one of said ribs a plurality of collector bus bars are mounted to aid in transferring electrical energy to the operating controls of the chair 60 for manipulation thereat by operating personnel seated in the chair. Such controls (not shown) are provided with electric interlocks in a conventional manner so that for example the chair can be retracted only when it is juxtaposed to the chair access opening 126 (FIG. 3). The collector bus bars and brushes are wired in a conventional manner for transferring electrical energy from stationary to moving parts, and vice versa, and therefore, the attendant circuitry is not shown in detail.

Figure 5:
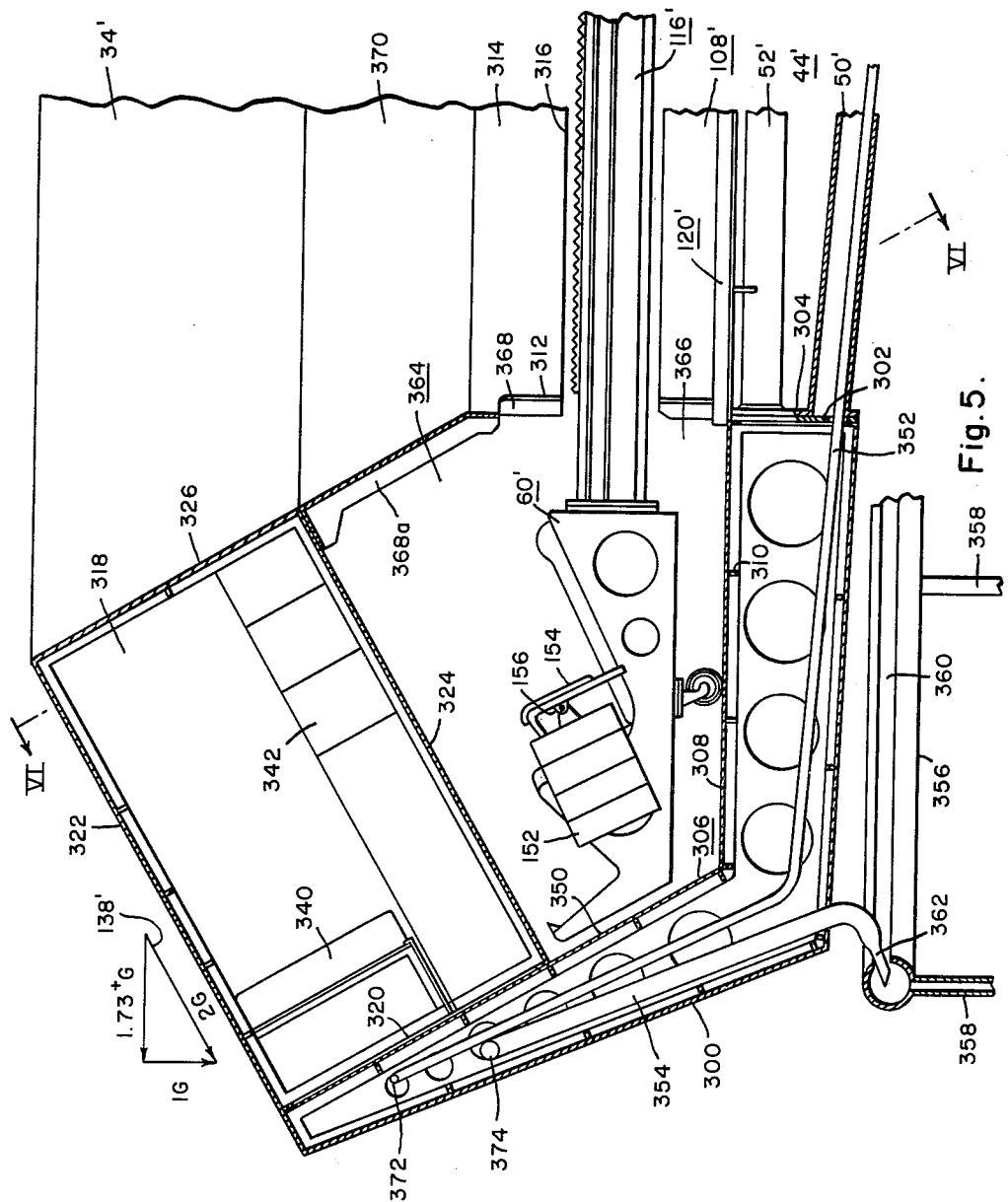
FIG. 5 is an enlarged cross-sectional view, generally similar to the sectioned portion of FIG. 3, of a gravitational facility arranged in accordance with the invention for occupation by men for prolonged periods of time, and taken along reference line V—V of FIG. 6.
Figure 6:
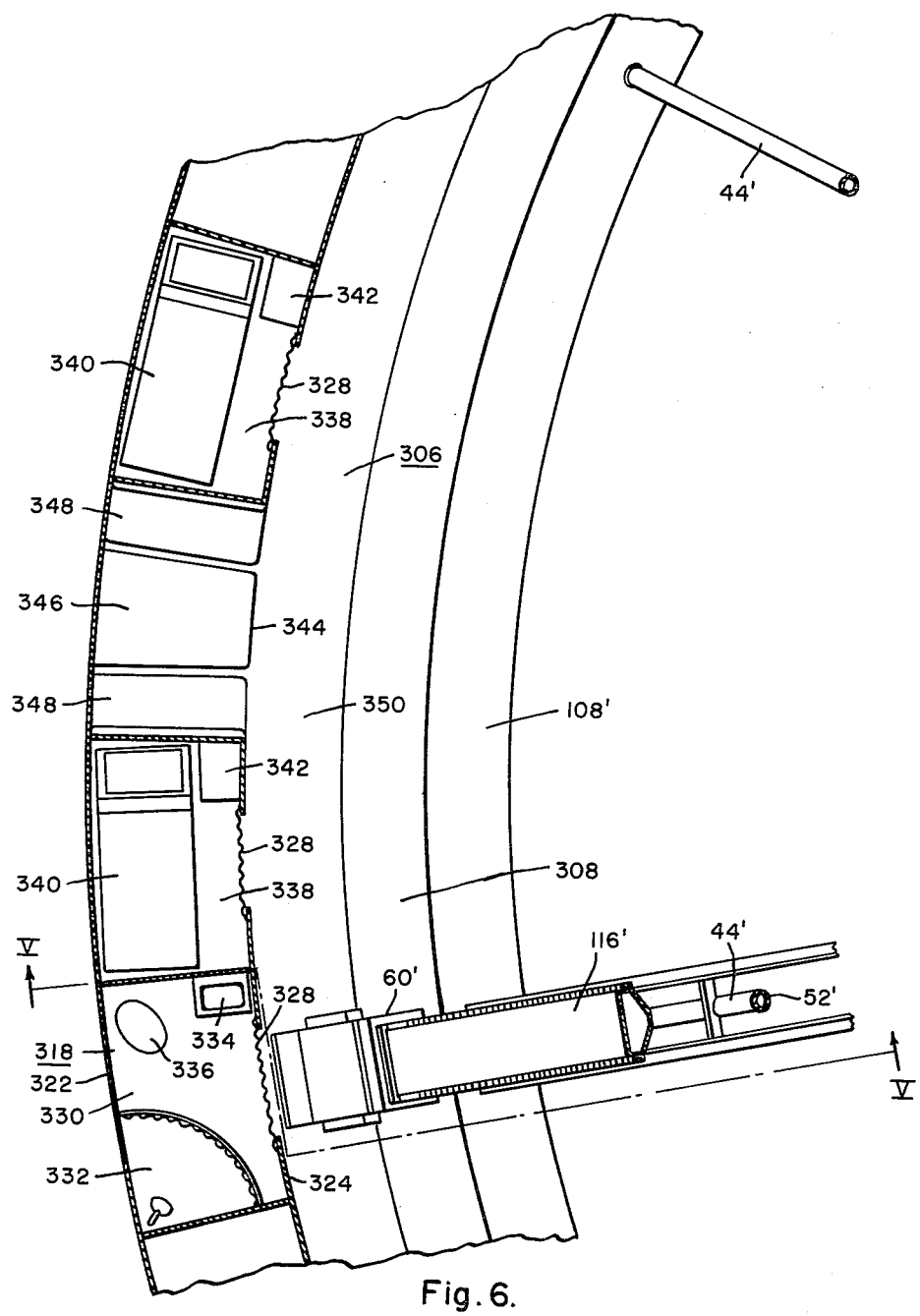
FIG. 6 is a horizontally sectioned view of a portion of the toroidal periphery of the gravitational facility and showing a floor plan of one suitable arrangement of living quarters for prolonged occupation of the gravitational facility.

Referring now to FIGS. 5 and 6 of the drawings another arrangement of the rotatable torus 43' is disclosed therein as arranged for use for the purpose of housing human volunteers for subjection to a 2 G or other gravitational force field for extended periods. The living quarter torus 43' is supported by a plurality of spoke assemblages 44' similar to those described at 44 in FIG. 3 of the drawings. The spoke assemblages 44' are mounted on the supporting and driving assembly in a manner similar to that described above in connection with FIG. 4 of the drawings.

The torus 43' proper is partially formed and supported by a plurality of angle beams 300, which are joined in cantilever fashion at their lower right-hand ends, as viewed in FIG. 5 of the drawings, to an inner peripheral beam plate 302 to which in turn are joined the flanged ends 304 of the tubular spokes 50' and 52'. Suitable floor coverings 306 and 308, fabricated for example from sheet metal are secured to the upper surfaces of the beams 300 and supported therebetween by transverse brace members 310. The floor 308 forms a peripheral track or passageway for the chair 60' constructed and manipulated in a manner substantially similar to that described previously in connection with FIG. 3 of the drawings. Thus, the chair 60' is adapted for insertion and retraction through opening 312 in the inner periphery 314 of the torus 43' and for rotation of its supporting boom structure 116' through the inner peripheral torus slot 316.

The floor portion 306, which in the locale of the living quarters proper of the torus 43', designated by the reference character 318, desirably is provided with a rug or other suitable covering 320 for the comfort of the occupants. The floor 306 in this arrangement becomes the apparent "horizontal" floor or the gravitational floor of the gravitational facility during operation of the torus 43', since the floor 306 is disposed normal to the resultant gravitational 2 G force vector as indicated by the vector diagram 138'. It will be appreciated of course that the angle beam 300 can be provided with some other included angle than that shown if it is desired to rotate the torus 43' at such speed as to induce some other resultant gravitational force field.

By the same token, the outer wall 322 and the inner partition wall 324 become the side walls respectively of the living quarters 318 and, of course, then appear to be "plumb" during rotation of the torus 43' while the wall portion 326 becomes the roof or ceiling structure. The walls 322 and 324 together with the ceiling structure 326 can be formed from metal beams or studding covered by sheet metal. As better shown in FIG. 6 of the drawings, the inner wall structure or partition 324 is provided with a number of entrances or doorways which are screenable by a curtain structure 328. Also as shown in FIG. 6 the living quarters 318, which can extend throughout the entire interior of the torus 43', are divided into a plurality of four-room apartments 329, each including a bath 330 having a curtained shower stall 332, a sink 334 and a commode 336. Each apartment 330 also includes a pair of sleeping rooms 338, each with a bed 340 and closet 342, and an eating nook 334 with a table 346 and benches 348.

Each of the aforementioned rooms open upon an inner peripheral hallway and chair gangway 350 to which access is had by means of the retractable chair structure 60', which is arranged so that the chair occupants are seated erect relative to the induced gravitational field as explained heretofore in connection with FIG. 3 of the drawings. The chair mechanism can be revolved to the entrance of any one of the apartments 329 in order to minimize the exertion of walking along the hallway 350 in an induced 2 G field. As stated previously, supplies can be brought in or removed from the rotating torus 43' by means of the supply box 152 which is mounted as aforesaid in a force vector seeking arrangement on the arm of the chair 60'.

To supply fresh water to the sink 334 and the shower stall 332 an internal water main 352 enters through an axial hole 351 in the central supporting shaft 38 and thence through one of the tubular spokes 50'. The water main 352 is connected to an external water main 353 or suitable source or supply of fresh water through a rotational seal coupling 355 mounted adjacent the lower end of the supporting and driving shaft 38. The passage of the internal water main 352 through the bottom closure of the oil-filled housing 182 is sealed by a conventional packing gland denoted generally by the reference character 357.

To remove wastes from each apartment 330, all of the fixtures of each bath 330 thereof are connected in a known manner to a sewer manifold 354 extending peripherally throughout the torus 43' together with the water main 352. A circular stationary sewer collector 356 is disposed generally below the rotatable torus 43' and supported upon a plurality of drain downcomer pipes 358, which in turn are collected to a suitable underground sewage system (not shown). The inner periphery of the sewer collector 356 is provided with a continuous open slot 360 which is wide enough to accommodate during rotation of the torus 43', the outlet end portion 362 of one or more connecting conduits 355 coupled to the sewer manifold 354.

When the chair 60' is inserted into the torus 43' it is housed in the separate compartment or gangway 350 relative to the living quarters proper 318. A number of cantilever ceiling joists 368 support the ceiling structure 370 of the chair accommodating gangway 350 and delineate the upper limit of the continuous peripheral slot 316. At least one of the ceiling joists 368A is foreshortened in order to define the chair accommodating opening 312, which opening of course extends downwardly to the chair track 120'. As described previously in connection with FIG. 3, the lower limit of the chair boom slot 316 is defined by a stud wall portion 108'.

In order to reduce windage friction to a minimum and to prevent draft in the living quarters 318 of the torus 43' or in the cage quarters of the torus 43 (FIG. 3) these areas of the associated torus are completely enclosed except for the chair boom slots 104 or 316 respectively. These slots however do afford adequate ventilation to the torus 43' without the causation of drafts.

In order to reduce the Coriolis force to tolerable limits for human occupation, the distance from a point directly above one of the beds 340 to the central axis of the gravitational facility desirably should be at least 25 feet. In this arrangement of the invention, a simulated gravitational force of 2 G at this point is attained by rotating the structure at approximately 14.3 r.p.m. For ease and transportation of the gravitational facility desirably the torus 43' or 43 is fabricated as a plurality of factory-assembled section, each being sufficiently small to permit shipment by truck or railroad car, which sections can then be assembled in the field by bolting or otherwise fastening to one another and to the supporting spoke assemblages 44.

From the foregoing, it will be apparent that novel and improved forms of gravitational apparatus have been disclosed herein. From this description it will also be apparent that numerous changes can be made in the invention as disclosed without departing from the spirit and scope of the invention. Accordingly, it is intended that the foregoing descriptive materials be taken as illustrative of the invention and not as limitative thereof. Moreover, it is to be understood that certain features of the invention can be employed without a corresponding use of other features.

What is claimed as new is:

1. In a gravitational facility the combination comprising a rotor, means for supporting said rotor adjacent the central axis thereof for rotation, said rotor including a peripheral hollow torus member, said torus member forming an enclosed cabin of annular configuration, a central hub member engageable with said supporting means, spoke means joined respectively at their ends to said hub member and to said torus member for fixedly supporting said torus on said hub member for rotation therewith, track means extending between said hub member and said torus member, and an access chair mounted on a wheel supported axle and movable along said track means and between said hub member and an opening therefor in said torus member to afford access to the interior of said cabin during operation of said rotor.

2. In a gravitational facility the combination comprising a rotor, means for supporting said rotor adjacent the central axis thereof for rotation, said rotor including a peripheral hollow torus member, said torus member forming an enclosed cabin of annular configuration, a central hub member engageable with said supporting means, spoke means joined respectively at their ends to said hub member and to said torus member for fixedly supporting said torus on said hub member for rotation therewith, track means extending between said hub member and said torus member, an access chair mounted on a wheel supported axle and movable along said track means and between said hub member and an opening therefor in said torus member to afford access to the interior of said cabin during operation of said rotor, said track means being supported along its length on one of said spoke means.

3. In a gravitational facility the combination comprising, a rotor, means for supporting said rotor adjacent the central axis thereof for rotation, said rotor including a peripheral hollow torus member, said torus member forming an enclosed cabin of annular configuration, a central hub member engageable with said supporting means, spoke means joined respectively at their ends to said hub member and to said torus member for fixedly supporting said torus on said hub member for rotation therewith, track means extending between said hub member and said torus member, an access chair mounted on a wheel supported axle and movable along said track means and between said hub member and an opening therefor in said torus member to afford access to the interior of said cabin during operation of said rotor, gangway means supported within said cabin in alignment with said track means, and additional means for moving said access chair peripherally through said cabin and upon said gangway means when said chair is inserted through said torus opening.

4. In a gravitational facility the combination comprising a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, track means extending between said hub member and said torus member, an access chair mounted on a wheel supported axle for movement along said track means and between said hub member and an opening therefor in said torus member to afford access to the interior of said torus member during operation of said rotor, means for moving said chair along said tracks, said moving means including an elongated boom structure rigidly secured to said chair, a drive housing, and a stub shaft mounted for rotation on said hub member, said boom structure extending through said drive housing and slidably mounted relative thereto upon anti-frictional means supported in said housing, said drive housing being hingedly secured to an end of said stub shaft so that said chair and said boom means and said drive housing are free to follow any slight deviations in the predetermined contour of said track means, and a driving mechanism mounted on said drive housing and drivingly engaging said boom structure to move the latter relative to said drive housing.

5. In a gravitational facility the combination comprising, a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, track means extending between said hub member and said torus member, an access chair mounted on a wheel supported axle and movable along said track means and between said hub member and an opening therefor in said torus member to afford access to the interior of said torus member during operation of said rotor, gangway means supported within said torus member in alignment with said track means, additional means for moving said access chair peripherally through said hollow torus when inserted through said torus opening, said chair moving means including a boom structure rigidly joined to said chair and extending for engagement with a driving arrangement mounted on said hub member, said additional track means extending continuously around the interior of said torus member, and said torus member having a chair boom accommodating slot extending entirely around its inner periphery so that when said access chair is inserted into said torus member said moving means can be operated to revolve said boom structure and chair to any position within the interior of said torus member during operation of said rotor.

6. In a gravitational facility the combination comprising a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, track means extending between said hub member and said torus member, an access chair mounted on a wheel supported axle and movable along said track means and between said hub member and an opening therefor in said torus member to afford access to the interior of said torus member during operation of said rotor, and said hollow torus member having at least one wall portion thereof conforming to a frustoconical section such that a radial section through the torus member intersects said frustoconical section in a line which is substantially parallel to the resultant gravitational force field vector at a predetermined rotative speed of said rotor so as to define a line of reference indicating the direction of induced gravitational field at any location within said torus member when rotated at said predetermined speed.

7. In a gravitational facility the combination comprising a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, track means extending between said hub member and said torus member, an access chair mounted on a wheel supported axle and movable along said track means and between said hub member and an opening therefor in said torus member to afford access to the interior of said torus member during operation of said rotor, said hollow torus member having at least one wall portion thereof conforming to a frustoconical section such that a radial section through the torus member intersects said frustoconical section in a line which is substantially parallel to the resultant gravitational force field vector at a predetermined rotative speed of said rotor so as to define a line of reference indicating the direction of induced gravitational field at any location within said torus member when rotated at said predetermined speed, and a plurality of apartments constructed within said torus member and having their side walls generally parallel to said line of reference and their ceiling and floor walls generally normal thereto so that at said predetermined speed of rotation of said rotor the walls of said apartments appear to be plumb to occupants housed within said apartments.

8. In a gravitational facility the combination comprising a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, and said hollow torus member having at least one wall portion thereof conforming to a frustoconical section such that a radial section through the torus member intersects said frustoconical section in a line which is substantially parallel to the resultant gravitational force field vector at a predetermined rotative speed of said rotor so as to define a line reference indicating the direction of induced gravitational field at any location within said torus member when rotated at said predetermined speed.

9. In a gravitational facility the combination comprising a rotor, means for supporting said rotor adjacent the central axis thereof for rotation, said rotor including a peripheral hollow torus member, a central hub member engageable with said supporting means and spoke means joined respectively at their ends to said hub member and to said torus member in order to support said torus on said hub member for rotation therewith, said hollow torus member having at least one wall portion thereof conforming to a frustoconical section such that a radial section through the torus member intersects said frustoconical section in a line which is substantially parallel to the resultant gravitational force field vector at a predetermined rotative speed of said rotor so as to define a line of reference indicating the direction of induced gravitational field at any location within said torus member when rotated at said predetermined speed, and a plurality of apartments constructed within said torus member and having their side walls generally parallel to said line of reference and their ceiling and floor walls generally normal thereto so that at said predetermined speed of rotation of said rotor the walls of said apartments appear to be plumb to occupants housed within said apartments.

10. In a gravitational facility the combination comprising a rotor, means for supporting said rotor adjacent the central axis thereof for rotation, said rotor including a peripheral hollow torus member, said torus member forming an enclosed cabin of annular configuration, a central hub member engageable with said supporting means, spoke means joined respectively at their ends to said hub member and to said torus member for fixedly supporting said torus on said hub member for rotation therewith, track means extending between said hub member and said torus member, an access chair mounted on a wheel supported axle and movable along said track means and between said hub member and an opening therefor in said torus member to afford access to the interior of said cabin during operation of said rotor, a number of supporting brackets secured to the inner wall structure of said torus member, and a plurality of experiment housing structures hingedly secured to said brackets respectively, the hinge pins of said hinged securances being disposed generally normal to radii of said rotor so that said housing structures are suspended in a force vector seeking fashion.

11. In a gravitational facility the combination comprising a rotor, means for supporting said rotor adjacent the central axis thereof for rotation, said rotor including a peripheral hollow torus member, a central hub member engageable with said supporting means, spoke means joined respectively at their ends to said hub member and to said torus member in order to support said torus on said hub member for rotation therewith, said hollow torus member having at least one wall portion thereof conforming to a frustoconical section such that a radial section through the torus member intersects said frustoconical section in a line which is substantially parallel to the resultant gravitational force field vector at a predetermined rotative speed of said rotor so as to define a line of reference indicating the direction of induced gravitational field at any location within said torus member when rotated at said predetermined speed, a plurality of apartments constructed within said torus member and having their side walls generally parallel to said line of reference and their ceiling and floor walls generally normal thereto so that at said predetermined speed of rotation of said rotor the walls of said apartments appear to be plumb to occupants housed within said apartments, at least one of said spoke means being of tubular configuration, a water main passing through said supporting shaft and through said spoke means and coupled to a water manifold means for supplying water to sanitary fixtures disposed in each of said apartments, and stationary conduit means for supplying water to said water main from an external source thereof including a rotary coupling means connecting said stationary conduit means to said water main.

12. In a gravitational facility the combination comprising a rotor, means for supporting said rotor adjacent the central axis thereof for rotation, said rotor including a peripheral hollow torus, a central hub member engageable with said supporting means, spoke means joined respectively at their ends to said hub member and to said torus in order to support said torus on said hub member for rotation therewith, said hollow torus having at least one wall portion thereof conforming to a frustoconical section such that a radial section through the torus intersects said frustoconical section in a line which is substantially parallel to the resultant gravitational force field vector at a predetermined rotative speed of said rotor so as to define a line of reference indicating the direction of induced gravitational field at any location within said torus member when rotated at said predetermined speed, and a plurality of apartments constructed within said torus member and having their side walls generally to said line of reference and their ceiling and floor walls generally normal thereto so that at said predetermined speed of rotation of said rotor the walls of said apartments appear to be plumb to occupants housed within said apartments, at least one of said spoke means being of tubular configuration, a water main passing through said supporting shaft and through said spoke means, and coupled to a water manifold means for supplying water to sanitary fixtures disposed in each of said apartments, means for supplying water to said water main from an external source thereof, a generally circular sewage collector having a slot extending continuously around the periphery thereof and disposed generally below said rotor, and a sewer manifold mounted within said torus and coupled to said sanitary fixtures, said sewer manifold having a downcomer pipe protruding downwardly from said torus and having its lower open end engaged in said slot for continuous discharge of sewage during rotation of said rotor.

13. In a gravitational facility the combination comprising a rotor, means for supporting said rotor adjacent the central axis thereof for rotation, said rotor including a peripheral hollow torus a central hub member engageable with said supporting means, spoke means joined respectively at their ends to said hub member and to said torus member in order to support said torus on said hub member for rotation therewith, track means extending between said hub member and said torus, an access chair mounted on a wheel supported axle and movable along said track means and between said hub member and an opening therefor in said torus to afford access to the interior of said torus during operation of said rotor, a housing structure surrounding said rotor, catwalk means suspended within said housing structure and generally above said rotor, said catwalk structure having an opening therein substantially in alignment with and spaced above said hub member, a generally tubular access member rotatably mounted on said hub member, said access member having a first opening disposable generally above said track means for access to said chair in its retracted position and a second opening juxtaposed closely to said catwalk opening, and clutch means mounted on said access member for controlling the rotation of said access member relative to said rotor and for controlling the stationary disposition of said access member relative to said catwalk means.

References Cited by the Examiner

UNITED STATES PATENTS

| | | | |
|---|---|---|---|
| 508,994 | 11/93 | Sprague | 272—35 |
| 1,501,613 | 7/24 | Maynes | 272—44 |
| 2,780,460 | 2/57 | Eyerly | 272—49 X |
| 3,010,219 | 11/61 | Schueller | 35—12 |

FOREIGN PATENTS 1,127,028  4/62  Germany.

EUGENE R. CAPOZIO, *Primary Examiner.*

LAWRENCE CHARLES, *Examiner.*